April 22, 1930.                J. W. L. KOEHNE                1,755,220
                             PHOTOGRAPHIC CAMERA
                           Filed Nov. 30, 1928          2 Sheets-Sheet 1
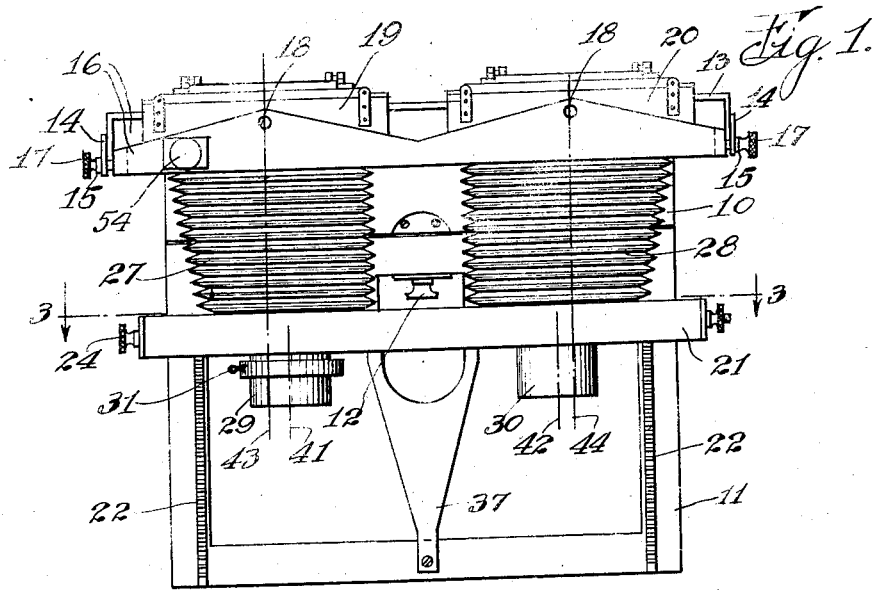
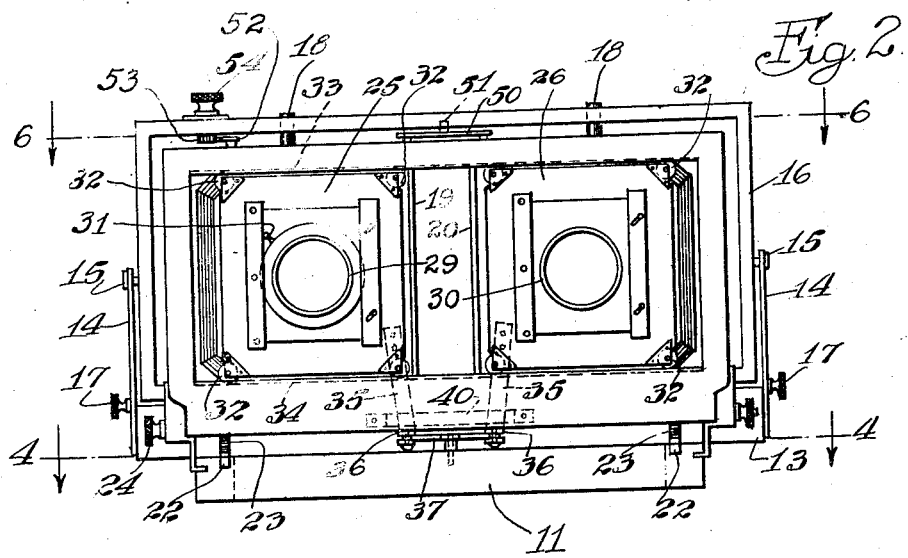
INVENTOR.
JACK WILLIAM L. KOEHNE
BY Albert C. Bell
ATTORNEY.

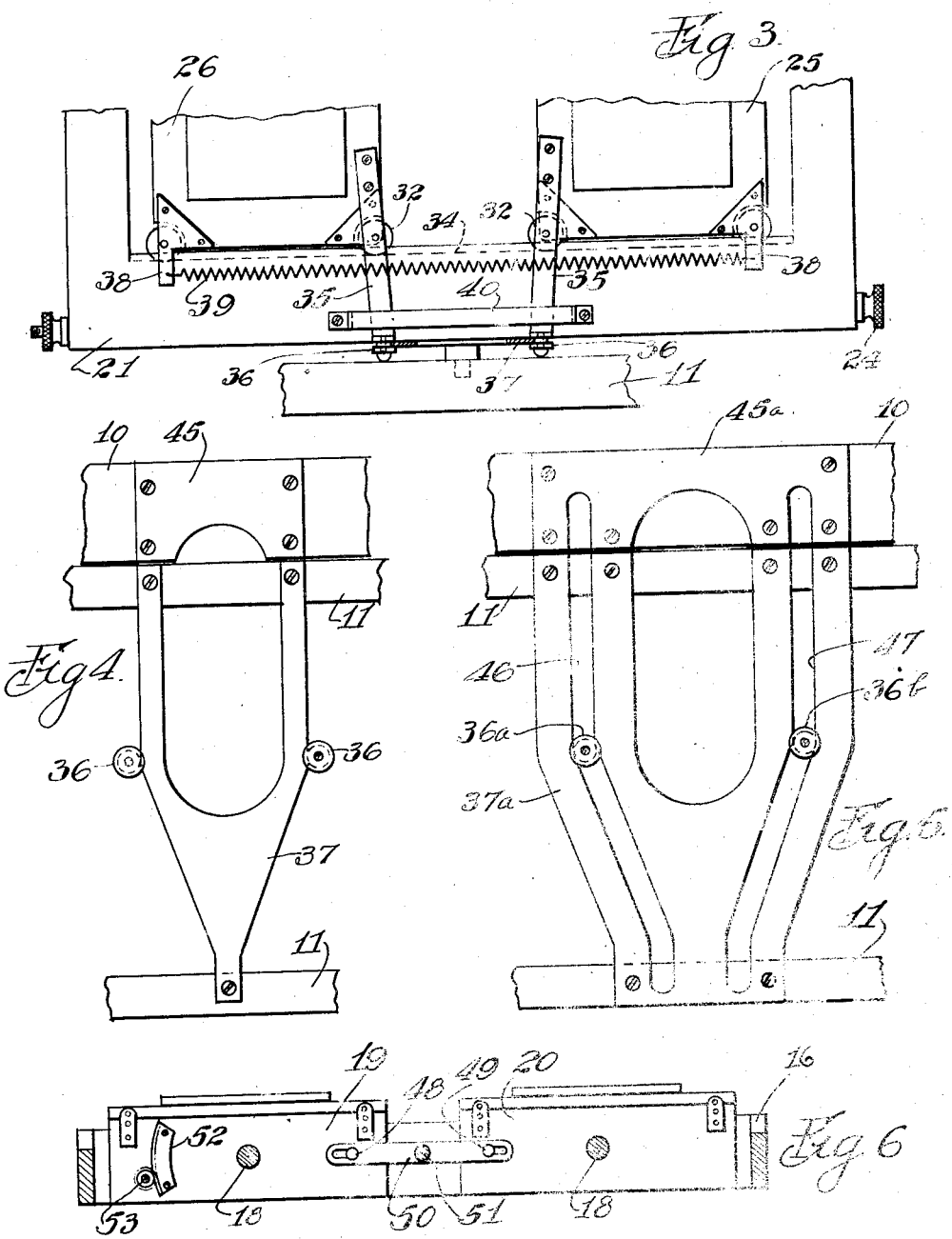

Patented Apr. 22, 1930

1,755,220

UNITED STATES PATENT OFFICE

JACK WILLIAM L. KOEHNE, OF CHICAGO, ILLINOIS

PHOTOGRAPHIC CAMERA

Application filed November 30, 1928. Serial No. 322,715.

My invention relates to an improved construction of photographic camera by which two camera units of the same kind and size are employed as a part of a single mechanism, so that one of the camera units may be employed to make the photographic image on a light-sensitive plate or film, and the other may be employed as a full-size finder to show the operator the exact condition of the image that will be produced on the sensitive plate or film, if the corresponding lens is opened to permit light to pass through it.

In carrying out my invention, I preferably employ two camera units which are identical in kind and size and equip these units with two lenses which are of the same kind and size and carefully matched so that each lens will produce the same image on the picture plane of its unit as the other does, assuming that the two camera units are similarly adjusted. These camera units I mount on a common bed, so that the camera backs of the two units are supported thereon by a rear framework and the lenses and front boards of the two units are supported on said bed by a front framework, the said parts of the two units being so supported by said frameworks, that the picture planes of the two cameras are either coincident or parallel at all times, and that the lens axes are parallel at all times. The two frameworks referred to, are so supported on the bed, that they may be separated from each other or brought nearer to each other, as required to focus the lenses.

My improved camera construction is particularly applicable to studio and portrait work generally, and since this involves having the objects or persons being photographed, relatively near the camera, I find it advisable to have the axes of the lenses somewhat closer together than the corresponding axes of the camera backs, for conditions representing the greatest distance from the lenses to the objects being photographed. To maintain the images in the two camera units, at the same locations laterally on the picture planes of the two units, I provide devices by which when the distance of the lenses from the picture plane or planes is changed, the lenses will move towards or away from each other as the case may be, in such a manner that although the distance of the lenses from the object or objects being photographed is changed, there will be no displacement of the images laterally on the picture plane or planes, and yet that the lens axes are maintained parallel to each other at all times. In this manner, the image produced on the picture plane of the finder camera unit is not only in the same focus as the image produced on the sensitive film or plate, if the other camera unit is employed at the same instant to photograph the object, but in addition, the image on the picture plane of the finder unit, is always in the same location on its picture field, as that occupied by the image on the picture plane of the other camera unit, and furthermore, the picture planes of the camera units are always parallel with the main plane of the object being photographed, so that conditions of lighting and detail appearance generally of the image on the picture plane of the finder unit, will indicate faithfully the corresponding detail of the image made on the sensitive plate or film. To further carry out my invention, I preferably mount the two camera backs in their supporting framework, in such a manner that they do not only may be simultaneously swung on a horizontal axis to place the two picture planes parallel with the plane of the object or objects being photographed, but also that the two camera backs may be simultaneously swung on vertical axes and in the same direction, so that the picture planes are maintained in parallel relation with each other, at all times that they are not coincident also to permit adjusting the picture planes so that they are parallel with the plane or planes of the object being photographed.

My invention will best be understood by reference to the accompanying drawings showing a preferred embodiment thereof, in which Fig. 1 shows my improved camera construction in plan view, Fig. 2 shows in front elevation the construction illustrated in Fig. 1, Fig. 3 is a sectional view of the parts shown in Fig. 1 taken along the line 3—3, Fig. 4 is a sectional view of the parts shown in Fig. 2 taken along the line 4—4, Fig. 5 shows in a view similar to Fig. 4 a modified construction of controlling mechanism for moving the lens axes towards and from each other, and Fig. 6 is a sectional view of the parts shown in Fig. 2 taken along the line 6—6.

Similar numerals refer to similar parts throughout the several views.

As shown in Figs. 1 and 2 my improved camera construction consists of a bed 10 which may be given permanent support in any manner desired, whether by mounting it on a tripod or placing it on a stand, according to the conditions under which the work is to be done. The bed 10 is provided with a bed extension 11, which may be secured to the bed in any convenient manner, for example by a clamping screw 12, to facilitate closing the camera into compact form when it is not in use. The bed 10 carries at its rear end a mounting member 13 on the ends of which, upwardly extending arms 14 are secured, which arms at their upper ends carry pivot studs 15 to support a rear framework 16 for turning movement on a horizontal axis. This part of the construction is for the purpose of effecting a so-called "vertical swing" of the camera backs and may conveniently be accomplished in any manner well known in the art, by an operating head or heads 17. The rear framework 16 carries vertical pivot studs 18, 18 to support the camera backs 19 and 20 of the two camera units so they may be swung on vertical axes to effect a so-called "horizontal swing" of the camera backs. The camera backs 19 and 20 may be of any desired construction well known in the art, whether reversible or not, as long as they are provided with devices of one form or another for holding plate holders on the backs when taking a picture, or holding ground glass or focusing screens when focusing the camera. In using my camera construction, I preferably place a plate holder on one of the camera backs, for example the back 19, with a sensitive plate or film in the plate holder, and with the slide of the plate holder withdrawn to present the light sensitive surface of the plate or film to the interior of the corresponding camera unit, during the entire time of adjusting and manipulating the camera as indicated and required by the image formed on the focusing screen carried by the back 20.

The bed 10 and bed extension 11 are provided with horizontal guideways supporting a front framework 21 in vertical position so that it may be moved towards and from the back framework 16 on the bed extension 11, this movement being preferably accomplished by racks 22, pinions 23 and an operating head 24 in a manner well known in the art.

The frameworks 16 and 21 are preferably so constructed and mounted that they are maintained in parallel relation at all times.

The front framework 21 carries in substantially the same vertical plane, two front boards 25 and 26, connected by bellows 27 and 28 with the camera backs 19 and 20 respectively. The front boards 25 and 26 support lenses 29 and 30 which are preferably of the same construction and size and carefully matched, so that they are as nearly as possible identical in all respects excepting that the lens 29 may be provided with a shutter mechanism 31 for opening and closing the lens as desired in taking the picture. Since the lens 30 is used in connection with the finder unit of the camera, there is no need for a shutter mechanism in connection with it.

The front boards 25 and 26 carry at their corners, rollers 32 which enter shallow grooves 33 and 34 in the front framework to hold the front boards in substantially the same vertical plane and permit the front boards to move freely towards and from each other in the front framework, maintaining at all times the axes of the lenses 29 and 30 in the same horizontal plane and parallel with each other.

The front boards 25 and 26 have extending downwardly from them, back of the front framework 21, arms 35, which arms are rigidly secured to the front boards and carry at their lower ends, grooved rollers 36, 36 engaging the opposite edges of a cam plate 37 carried in horizontal position by the bed extension 11. The cam plate 37 is tapered laterally so that when the front framework 21 is adjusted for correct focal positions of the lenses with the object relatively near the lenses and at different distances therefrom, the movement of the front boards laterally towards or from each other on the framework 21, will maintain each of the images of the object at the same location laterally on its picture plane that the other image has on its picture plane, and thus the image observed by the operator on the focusing screen of the camera back 20, will be a duplicate as to location and as to all of its detail of the image that would be formed at any instant on the light-sensitive plate or film carried by the back 19, if the lens 29 were open at that instant.

As shown in Fig. 3, the outer edge portions of the front boards 25 and 26 have secured to them and extending back of the front framework 21, brackets 38 connected by a spring 39 which tends to move the front boards 25 and 26 towards each other at all times as far as the cam plate 37 will permit. The lower portion of the front framework 21 carries a bent bar 40 around the lower ends of the arms 35 to prevent their movement from adjacent the rear surface of the front framework and yet permit them to move freely towards and from each other.

As indicated in Fig. 1, it is desirable that the lens axes illustrated at 41 and 42 shall be displaced laterally towards each other, from the corresponding axes 43 and 44 of the camera backs 19 and 20, when the rollers 36 are on the parallel edge portions of the cam 37, provided to maintain the lenses at a maximum distance apart for the greatest distance of the object or objects to be photographed by the camera. This displacement results in the projection of light rays from the lenses upon the picture planes, at corresponding angles laterally, determined by the focal length of the lenses used and the lateral angles of the light rays from the object to the lenses for maximum distance of the object or objects from the lenses, the relation of these angles being such as to center the images on the picture planes of the camera units, although the central point or points of the object being photographed lies between the axes 41 and 42 of the lenses. The edges of the cam plate 37 are conformed, depending upon the particular lenses employed, to maintain substantially the same relation between the angles referred to for different adjustments and focal positions of the lenses, when the object or objects are relatively close to the lenses, and in this way the location of the images laterally on the picture planes of the camera units, is maintained.

The bed 10, as illustrated in Fig. 4 is preferably provided with a plate 45 to receive the rollers 36 when the camera construction is in its closed condition, so that the bed extension 11 may either be removed or folded against the front framework 21, depending upon the particular camera construction.

In the modified construction shown in Fig. 5, the cam plate 37ª is provided with two slots 46 and 47 for receiving the rollers 36ª and 36ᵇ, the slots being formed in the same manner as the edges of the cam plate 37, so that the cam plate itself not only moves the rollers from each other when the front framework 21 is moved towards the back framework 16, but also positively moves the rollers towards each other when the front framework 21 is moved in the reverse direction, thus permitting the elimination of the spring 39 from the construction. With this construction, the bed 10 is provided with a modified form of retaining plate 45ª, having slots to receive the rollers 36ª and 36ᵇ for the closed condition of the camera construction.

As shown in Fig. 6, the unit backs 19 and 20 carry on their upper surfaces, pivot studs 48 and 49 preferably in line with the pivot studs 18 when the camera backs are in the same plane and equidistant from said studs 18, which studs 48 and 49 extend through longitudinal slots in a lever 50 having a supporting stud 51 extending through its midportion equidistant from the studs 48 and 49 and supported by the top member of the rear framework 16. One of the unit backs, for example the back 19 carries on its upper surface a segmental gear 52 engaged by a pinion 53 rigidly secured to an operating knob 54 carried by the top member of the rear framework 16. As a result of the construction just described, turning the knob 54 swings the unit back 19 on its pivot studs 18, and the lever 50 causes turning movement in the same direction and of the same amount, of the unit back 20, thus imparting simultaneously to the two backs, a horizontal swing in the same direction and of the same amount, so that both camera backs may simultaneously be brought into parallelism horizontally with the plane of the object or objects being photographed.

While my improved camera construction described is susceptible of many uses, it is particularly valuable in portrait work, since the camera unit employed in making the picture, may be ready for exposure at any instant and the finder unit of the construction shows the operator at each instant precisely what the photographic image will be, not only as to the size of the image, but also the pose in its smallest detail, the focus of the image and the lighting, so that at the instant these several factors are satisfactory to the operator, he may instantly make the exposure. It will be noted that an important result secured by having the axes of the lenses always in parallelism, is that the construction approaches to the closest possible degree, the making of the two images from the same location and that a much truer result is secured because of focusing both camera units on the same object plane, than would be secured if the camera lenses were located so that their axes converged upon the object or objects, since in the latter case, different planes of the object or objects would be focused upon the picture planes of the camera units.

While I have shown my invention in the particular embodiment above described, it will be understood that I do not limit myself to this exact construction as I may employ equivalents known to the art at the time of the filing of this application without departing from the scope of the appended claims.

What I claim is:

1. In a photographic camera, the combination of a bed, front and rear frameworks carried by said bed and extending substantially perpendicularly therefrom, said front framework being movable on said bed towards and from said back framework to focus the camera, two camera backs of substantially the same size carried side by side by said rear framework with their picture planes in substantially the same plane, two front boards carried side by side by said front framework, two bellows respectively connecting said camera backs and said front boards, two lenses of substantially the same focal length carried by said front boards, said front framework having guideways supporting said front boards for movement towards and from each other, and mechanism carried by said bed and said front boards moving said front boards towards and from each other respectively proportionally to movement of said front framework from and towards said rear framework, said lens axes being substantially parallel at all times, said mechanism comprising arms extending from said front boards and a cam plate carried by said bed and engaging said arms.

2. In a photographic camera, the combination of a bed, front and rear frameworks carried by said bed and extending substantially perpendicularly therefrom, said front framework being movable on said bed towards and from said back framework to focus the camera, two camera backs of substantially the same size carried side by side by said rear framework with their picture planes in substantially the same plane, two front boards carried side by side by said front framework, two bellows respectively connecting said camera backs and said front boards, two lenses of substantially the same focal length carried by said front boards, said front framework having guideways supporting said front boards for movement towards and from each other, and mechanism carried by said bed and said front boards moving said front boards towards and from each other respectively proportionally to movement of said front framework from and towards said rear framework, said lens axes being substantially parallel at all times, said mechanism comprising arms extending from said front boards, a cam plate carried by said bed and engaging said arms, and spring mechanism holding said arms against the edges of said plate.

3. In a photographic camera, the combination of a bed, front and rear frameworks carried by said bed and extending substantially perpendicularly therefrom, said front framework being movable on said bed towards and from said back framework to focus the camera, two camera backs of substantially the same size carried side by side by said rear framework with their picture planes in substantially the same plane, two front boards carried side by side by said front framework, two bellows respectively connecting said camera backs and said front boards, two lenses of substantially the same focal length carried by said front boards, said front framework having guideways supporting said front boards for movement towards and from each other, and mechanism carried by said bed and said front boards moving said front boards towards and from each other respectively proportionally to movement of said front framework from and towards said rear framework, said lens axes being substantially parallel at all times, said mechanism comprising arms extending from said front boards and a cam plate carried by said bed and engaging said arms, said cam plate having cam slots therein engaging said arms to move said front boards laterally in both directions.

4. In a photographic camera, the combination of a bed, front and rear frameworks carried by said bed and extending substantially perpendicularly therefrom, said front framework being movable on said bed towards and from said back framework to focus the camera, two camera backs of substantially the same size carried side by side by said rear framework with their picture planes in substantially the same plane, two front boards carried side by side by said front framework, two bellows respectively connecting said camera backs and said front boards, two lenses of substantially the same focal length carried by said front boards, said front framework having guideways supporting said front boards for movement towards and from each other, and mechanism carried by said bed and said front boards moving said front boards towards and from each other respectively proportionally to movement of said front framework from and towards said rear framework, said lens axes being substantially parallel at all times, said mechanism comprising arms extending from said front boards, a cam plate carried by said bed and engaging said arms, and rollers carried by said arms and engaging said cam plate.

5. In a photographic camera, the combination of a bed, front and rear frameworks carried by said bed and extending substantially perpendicularly therefrom, said front framework being movable on said bed towards and from said back framework to focus the camera, two camera backs of substantially the same size carried side by side by said rear framework with their picture planes in substantially the same plane, two front boards carried side by side by said front framework, two bellows respectively connecting said camera backs and said front boards, two lenses of substantially the same focal length carried by said front boards, said front framework having guideways supporting said front boards for movement towards and from each other, mechanism carried by said bed and said front boards moving said front boards towards and from each other respectively proportionally to movement of said front framework from and towards said rear framework, said lens axes being substantially parallel at all times, said mechanism comprising arms extending from said front boards and a cam plate carried by said bed and engaging said arms, and rollers carried by said front boards engaging said guideways.

6. In a photographic camera, the combination of a bed, front and rear frameworks carried by said bed and extending substantially perpendicularly therefrom, said front framework being movable on said bed towards and from said back framework to focus the camera, two camera backs of substantially the same size carried side by side by said rear framework with their picture planes in substantially the same plane, two front boards carried side by side by said front framework, two bellows respectively connecting said camera backs and said front boards, two lenses of substantially the same focal length carried by said front boards, said front framework having guideways supporting said front boards for movement towards and from each other, mechanism carried by said bed and said front boards moving said front boards towards and from each other respectively proportionally to movement of said front framework from and towards said rear framework, said lens axes being substantially parallel at all times, said mechanism comprising arms extending from said front boards and a cam plate carried by said bed and engaging said arms, vertical pivotal connections between each of said camera backs and said rear framework, and devices connecting said camera backs permitting horizontal and simultaneous swinging movement thereof in the same direction and maintaining the picture planes of said camera backs in substantially parallel relation for any such swinging movement.

7. In a photographic camera, the combination of a bed, front and rear frameworks carried by said bed and extending substantially perpendicularly therefrom, said front framework being movable on said bed towards and from said back framework to focus the camera, two camera backs of substantially the same size carried side by side by said rear framework with their picture planes in substantially the same plane, two front boards carried side by side by said front framework, two bellows respectively connecting said camera backs and said front boards, two lenses of substantially the same focal length carried by said front boards, said front framework having guideways supporting said front boards for movement towards and from each other, mechanism carried by said bed and said front boards moving said front boards towards and from each other respectively proportionally to movement of said front framework from and towards said rear framework, said lens axes being substantially parallel at all times, said mechanism comprising arms extending from said front boards and a cam plate carried by said bed and engaging said arms, vertical pivotal connections between each of said camera backs and said rear framework, a horizontal lever pivotally connected at its mid portion with said rear framework between said camera backs and having slots in its ends, pivot studs extending vertically through said slots and carried by said camera backs respectively, a horizontal gear segment carried by one of said camera backs, and a pinion carried by said rear framework and meshing with said gear segment.

8. In a photographic camera, the combination of a bed, two similar camera units supported in parallel relation by said bed, each of said units comprising a camera back, a front board and a bellows, similar lenses of the same focal length carried by the front boards of said units, and mechanism simultaneously moving said front boards relatively to said camera backs and laterally relatively to each other, the axes of said lenses being at all times substantially parallel.

9. In a photographic camera, the combination of a bed, two similar camera units supported in parallel relation by said bed, each of said units comprising a camera back, a front board and a bellows, similar lenses of the same focal length carried by the front boards of said units, and mechanism simultaneously moving said front boards relatively to said camera backs and laterally relatively to each other, the axes of said lenses being at all times substantially parallel, said mechanism including a cam plate carried by said bed and having diverging cam surfaces, and members carried by said front boards and respectively engaging said cam surfaces to control said lateral movement of said front boards.

10. In a photographic camera, the combination of a bed, two similar camera units supported in parallel relation by said bed, each of said units comprising a camera back, a front board and a bellows, similar lenses of the same focal length carried by the front boards of said units, mechanism simultaneously moving said front boards relatively to said camera backs and laterally relatively to each other, the axes of said lenses being at all times substantially parallel, vertical pivotal supports for said camera backs, and devices connecting said camera backs permitting horizontal and simultaneous swinging movement thereof in the same direction and maintaining the picture planes of said camera backs in substantially parallel relation for any such swinging movement.

11. In a photographic camera, the combination of a bed, two similar camera units supported in parallel relation by said bed, each of said units comprising a camera back, a front board and a bellows, similar lenses of the same focal length carried by the front boards of said units, mechanism simultaneously moving said front boards relatively to said camera backs and laterally relatively to each other, the axes of said lenses being at all times substantially parallel, vertical pivotal supports for said camera backs, and devices connecting said camera backs permitting horizontal and simultaneous swinging movement thereof in the same direction and maintaining the picture planes of said camera backs in substantially parallel relation for any such swinging movement, said devices including a lever pivotally supported at its mid portion from said bed and engaging said camera backs at its ends, a segmental gear carried by one of said camera backs, and a pinion meshing with said segmental gear to operate it.

12. In a photographic camera, the combination of a bed, two similar camera units supported in parallel relation by said bed, each of said units comprising a camera back, a front board and a bellows, similar lenses of the same focal length carried by the front boards of said units, mechanism simultaneously moving said front boards relatively to said camera backs and laterally relatively to each other, the axes of said lenses being at all times substantially parallel, lateral guideways carried by said bed to support said front boards, and rollers carried by said front boards engaging said guideways.

13. In a photographic camera, the combination of a bed, two similar camera units supported in parallel relation by said bed, each of said units comprising a camera back, a front board and a bellows, similar lenses of the same focal length carried by the front boards of said units, and mechanism simultaneously moving said front boards relatively to said camera backs and laterally relatively to each other, the axes of said lenses being at all times substantially parallel, said mechanism including a cam plate carried by said bed and having cam surfaces diverging towards said camera backs, members carried by said front boards and extending adjacent said cam surfaces, rollers carried by said members and engaging said cam surfaces, and spring mechanism holding said rollers against said cam surfaces.

14. In a photographic camera, the combination of a bed, two similar camera units supported in parallel relation by said bed, each of said units comprising a camera back, a front board and a bellows, similar lenses of the same focal length carried by the front boards of said units, and mechanism simultaneously moving said front boards relatively to said camera backs and laterally relatively to each other, the axes of said lenses being at all times substantially parallel, said mechanism including a cam plate having parallel-edged cam slots diverging towards said camera backs, and rollers carried by said front boards and fitting said cam slots.

15. In a photographic camera, the combination of two camera units having similar lenses and fields of view, the axes of said lenses being substantially parallel at all times, and mechanism changing the distance of said lenses from each other for focal conditions upon an object at different distances, maintaining stationary the lateral location of images of said object upon the fields of view of said units for said different distances of said object, and devices for turning the fields of view of said units simultaneously and by the same amount in the same direction upon vertical axes.

In witness whereof, I hereunto subscribe my name this 27th day of November, A. D. 1928.

JACK WILLIAM L. KOEHNE.